D. C. WHITE.
ELECTRIC RAILWAY SIGNAL AND APPERTAINING MECHANISM.
APPLICATION FILED DEC. 7, 1912.
1,187,586.
Patented June 20, 1916.
2 SHEETS—SHEET 1.
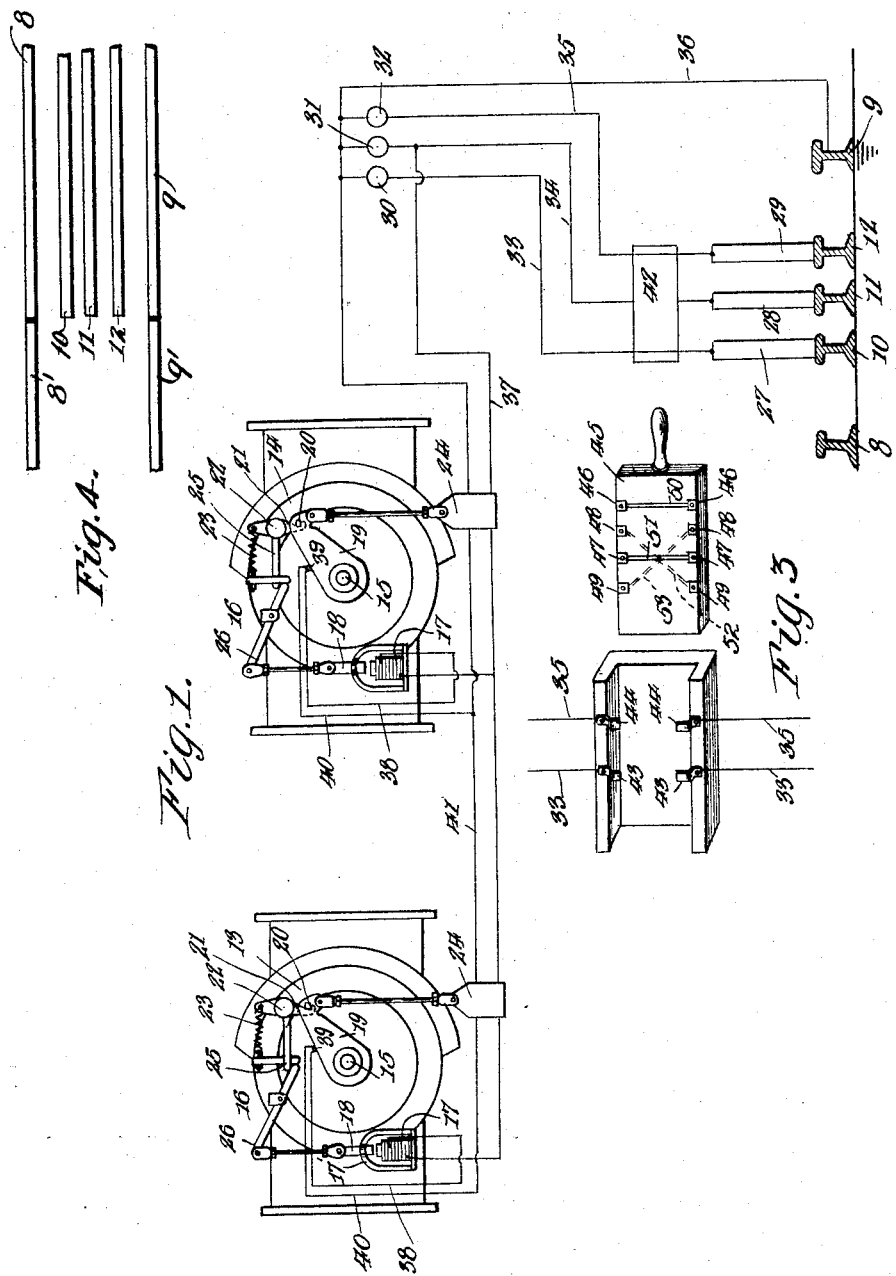
WITNESSES
INVENTOR D. C. WHITE.
ELECTRIC RAILWAY SIGNAL AND APPERTAINING MECHANISM.
APPLICATION FILED DEC. 7, 1912.
1,187,586.
Patented June 20, 1916.
2 SHEETS—SHEET 2.
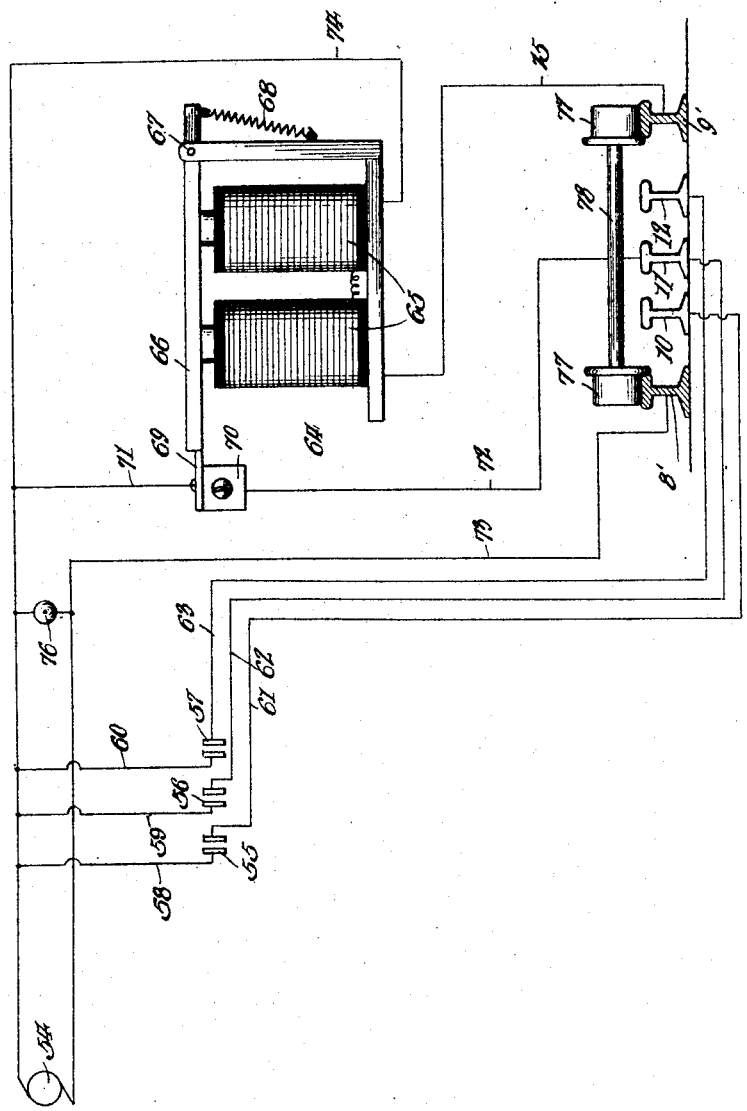
WITNESSES
INVENTOR
David Clark White,

UNITED STATES PATENT OFFICE.

DAVID CLARK WHITE, OF TYRONE, PENNSYLVANIA.

ELECTRIC RAILWAY-SIGNAL AND APPERTAINING MECHANISM.

1,187,586. Specification of Letters Patent. Patented June 20, 1916.

Application filed December 7, 1912. Serial No. 735,526.

*To all whom it may concern:*

Be it known that I, DAVID CLARK WHITE, a citizen of the United States, residing at Tyrone, in the county of Blair and State of Pennsylvania, have invented new and useful Improvements in Electric Railway-Signals and Appertaining Mechanisms, of which the following is a specification.

My present invention relates to electric railway signals and appertaining mechanisms whereby the passage of vehicles over a certain section of the track, termed a block, is controlled from a stationary point, such as a signal tower, or a second vehicle automatically controlled by a vehicle previously advanced upon the track in the block, to avert accidents, such as a rear end collision.

The principal objects of my invention are to provide mechanism of the character described which is well adapted to be disposed in operative relation to existing track sections and vehicles for movement thereon; to provide means whereby a vehicle in the block will provide for automatic stoppage of a second vehicle advanced into the block; to provide means whereby the movement of the vehicles in the block may be positively controlled, or controlled by visual signals, movable with the vehicles and in combination with visual signals stationarily mounted. if desired; and to provide an improved switch for adapting certain mechanisms for successful operation, regardless of the direction of movement of the vehicle over the track.

Other objects of my invention will appear in the following detailed description, taken in connection with the accompanying drawings, forming a part of this specification, and in which drawings:

Figure 1 is a view partly in elevation and partly in section, with parts diagrammatically represented, of an apparatus embodying my invention. Fig. 2 is a view similar to Fig. 1 showing a further embodiment of my invention. Fig. 3 is a perspective view of a switch member which may be provided to adapt the mechanism for successful operation, as hereinafter described, regardless of the direction of movement of the vehicle upon its track. Fig. 4 is a fragmentary plan view of a track section included within a block.

Referring first, more particularly to Fig. 1 of the drawing, 8 and 9 designate the main rails of a track section which constitutes the block. As disclosed, one of the rails, (that designated 9) is grounded. Preferably intermediate the rails 8 and 9 I provide three supplementary rails 10, 11 and 12, insulated one from another and extending longitudinally of the former, or any other suitable conducting means may be similarly disposed, insulated one from another, and providing treads.

Assuming that the vehicle to ride upon the rails 8 and 9 is of the type actuated and controlled by fluid pressure, 13 designates a device for controlling the motive power thereof, such as a valve for controlling the fluid pressure of the feed-way of the vehicle motor; and 14, a device for controlling the means for retarding the movement of the vehicle, such as a valve for control of the fluid pressure associated with the braking system of the vehicle, the stems of these devices are designated by 15. The stem of each device has mechanism designated generally by 16, which is adapted to actuate said stem when an electric circuit is completed through an electro-magnet 17.

In addition to electro-magnet 17, each mechanism 16 preferably comprises an armature 18 for coöperation with magnet 17 and guided by frame 17'; a lever 19 rigid with stem 15, said lever having an abutment 20; a pawl 21 pivoted to swing about point 22, for engagement with abutment 20 and holding the lever 19 in a predetermined position; yieldable means 23 for normally retaining said pawl in engagement with abutment 20; a means 24, such as a pendent weight, for actuating lever 19 when freed by pawl 21; an arm 25 movable with pawl 21; and, a lever 26 operatively connected with armature 18 to actuate arm 25 against action of means 23, when the said armature is actuated by energy of the electro-magnet 17. The pawl 21 normally retains lever 19, so that the device its stem is associated with, permits of free movement of the vehicle. The vehicle also carries collector shoes or contacts 27, 28 and 29 for engagement with the treads or conducting means 10, 11 and 12, respectively, and three electric lights, 30, 31 and 32, preferably colored white, red, and green, respectively, are provided. The white light indicates safety; the red light, danger or stop; and, the green light, caution, as is usual in railway signals. Contact 27 is conductively connected with one lead of light 30, by conductor 33; contact 28 with one lead of light 31 by conductor 34; and, contact 29 with one lead of light 32, by conductor 35, so that upon the completion of a circuit through any or all of these conductors, their respective lights are on. The other leads of lights 30, 31 and 32 are conductively connected with a conductor 36 adapted to be disposed in conductive relation with the grounded rail 9. Now, in order that the devices 13 and 14 may be actuated for stoppage of the vehicle whenever a circuit is conducted through light 31, or in other words, whenever the contact 28 engages the electrified rail 11, the said contact 28 is conductively connected, as by conductor 37, with one lead of each electro-magnet 17. The other lead of each of said magnets has connected therewith a conductor 38, the end of which is stationarily mounted so as to engage with a bridging piece 39 on arm 19 when the latter is held stationary by pawl 21. Another conductor 40 has its one end stationarily mounted to also engage bridging piece 39 when the said lever is in such restrained position, and each conductor 40 is in conducting communication with grounded rail 9, as through conductor 41. The bridging piece 39 serves to break the circuit through the electro-magnet 17 as soon as lever 19 is moved responsive to means 24.

It is to be noted that if rail 10 is electrified, by being in communication with one pole of an electric generator, the other pole of which is grounded, the light 30 will be on, which will indicate that the road is clear. If rail 12 is electrified, as previously described, the light 32 will be on, indicating caution. This coöperation of parts exists only when the vehicle is mounted on the rails with the contacts 27 and 29, to engage with the treads of conducting means 10 and 12. Assuming now that the vehicle has been turned, as at the roundhouse, so that contact 27 will engage with the tread of conducting means 12, then, with the connections as previously described, the light 30 would be on when rail 12 is electrified, but which is intended by the tower operator, to indicate caution.

To adapt the mechanism for successful operation so that the means 10 when electrified, will complete a circuit through light 30, or conducting means 12, a circuit through light 32, when contacts 27 and 29 engage with conducting means 12 and 10, respectively, I provide a switch more specifically shown in Fig. 7 of the drawings and designated generally by 42. This switch includes stationary contacts 43 adapted for connection with sections of conductor 33, and stationary contacts 44 for connection with sections of conductors 35; a movable bridge carrying member 45 having four pairs of contacts 46, 47, 48 and 49. The contacts 46 are conductively connected by bridging piece 50, while contacts 47 are connected by bridging piece 51. The contacts 46 and 47, and 48 and 49, are spaced relative to each other according to the spacing of contacts 43 and 44, so that the former two may contact with said contacts 43 and 44, simultaneously, or contacts 48 and 49 may simultaneously engage with said contacts. The contacts 48 and 49 are connected by diagonal bridging pieces 52 and 53, insulated one from another. Thus, with the contacts 46 and 47 engaging contacts 44 and 43, respectively, the contacts 27 and 29 are in conducting communication with lights 30 and 32, respectively. When the switch member 45 is actuated so that contacts 49 and 48 engage contacts 43 and 44, respectively, then contacts 27 and 29 are in conducting communication with lights 32 and 30, respectively.

Referring now more particularly to Fig. 4 of the drawings, 8' and 9' designate rails of the track, insulated from, and to form a continuation of the rails 8 and 9, disclosed in Fig. 1 of the drawings. These rails 8' and 9' are disposed in a section of the track with the rails 10, 11 and 12, in advance thereof. An electric generator 54, of any suitable construction is provided, and switches 55, 56 and 57. The switches are preferably adapted to be actuated simultaneously with the semaphore arms of visual signal apparatus of any suitable type, not shown in the drawings. It is obvious, that if only one semaphore arm is provided and the track condition determined by the angle of such arm, then only one movable switch element is necessary, together with three stationary contacts. In the example shown, the movable switch points of switches 55, 56 and 57 are operatively connected with one pole of the generator 54, as by conductors 58, 59 and 60. The stationary points of these switches are connected with rails 10, 11 and 12, by conductors 61, 62 and 63, respectively. Thus, assuming that switch 55 is closed, the rail 10 is electrified. When the contact 27 engages with the tread of this rail, the light 30 is on. Assuming, now, that switches 55 and 57 are open and switch 56 is closed, when contact 28 engages the tread of rail 11, the light 31 is on, and simultaneously a current passes through electro-magnets 17, energizing the same, and actuating devices 13 and 14, for the purpose hereinbefore described.

For the purpose of preventing accidents, such as a rear end collision, when a vehicle has entered the block, and so that a vehicle subsequently advanced into the block will be automatically stopped, I provide mechanism designated generally by 64. It preferably comprises electro-magnets 65; a movable armature 66 pivoted as at 67 and normally removed from engagement with the cores of the magnets by spring 68; a switch contact 69 carried by armature 66; and a stationary contact 70 for coöperation with contact 69, the said contacts engaging when the magnets 65 are energized and draw the armature 66 against action of spring 68. One pole of the generator is conductively connected with contact 69 as through conductor 71, while the other contact 70 is conductively connected with rail 11 as through conductor 72. The other pole of generator 54 is connected with rail 8' through conductor 73. One lead of electro-magnets 65 is connected with the same pole of generator 54 as is contact 69, through conductor 74, while the other lead of these magnets is connected with rail 9' through conductor 75. It is also desirable to dispose a light 76, at the tower, or adjacent the switches 55, 56 and 57, this light being on when a circuit is completed from rails 8' to 9'.

When a vehicle is advanced upon the rails 8' and 9', a circuit is completed through these rails, as by the vehicle wheels 77 and axle 78. The magnets 65 are immediately energized and draw the armature 66 toward their cores. This action brings contacts 69 and 70 into engagement and electrifies rail 11. The light 76 is simultaneously thrown on, so that the operator adjacent switches 55, 56 and 57 may be conscious of a vehicle in the block. Should another vehicle approach the rails 8' and 9', its contact 28, through engagement with the electrified rail 11 will complete a circuit, actuating devices 13 and 14 as hereinbefore described and such second vehicle will be rendered inoperative prior to its reaching rails 8' and 9'. As soon as the vehicle passes from the block and a circuit is no longer completed through rails 8' and 9', the armature 66 will be freed from magnets 65 and move responsive to spring 68, breaking the circuit at contacts 69 and 70.

It is believed that, from the foregoing, the operation of the several mechanisms will be understood, however, it desirable to point out that the mechanism 64 operates automatically to prevent a second vehicle from passing the supplementary rails, until the advance vehicle is moved from the block, and it is not necessary, under this condition, that the operator actuate the switch 56.

Changes in details may be made without departing from the spirit or scope of my invention; but,

I claim:—

In signal apparatus of the character described, the combination with a vehicle and a track section therefor, of three conducting members, insulated one from another, providing treads longitudinally of said track and parallel thereto, collector contacts carried by said vehicle, one for each of said contacting members, means for electrifying any one of said conducting members, electro-signal means for each collector contact, carried by said vehicle, and designed to indicate safety, danger and caution, respectively, means adapted to include the middle collector contact in the circuit of the danger signal means, and conducting means including a switch adapted to include in the circuit of the safety signal the first or third of said conducting members, simultaneously with the inclusion in the circuit of the caution signal of the third or first of said conducting members, respectively, substantially as and for the purpose set forth.

DAVID CLARK WHITE.

Witnesses:
 R. A. MILLER,
 W. F. TAYLOR.

Copies of this patent may be obtained for five cents each, by addressing the "Commissioner of Patents, Washington, D. C."